US012142088B2

(12) United States Patent
O'Sullivan

(10) Patent No.: US 12,142,088 B2
(45) Date of Patent: Nov. 12, 2024

(54) MESSAGING OF COMMUNICATION SERVICE ISSUES TO VEHICLE CREW AND PASSENGERS

(71) Applicant: VIASAT Inc., Carlsbad, CA (US)

(72) Inventor: Niall O'Sullivan, Dundrum (IE)

(73) Assignee: Viasat, Inc., Carlsbad, CA (US)

( * ) Notice: Subject to any disclaimer, the term of this patent is extended or adjusted under 35 U.S.C. 154(b) by 462 days.

(21) Appl. No.: 17/426,565

(22) PCT Filed: Jan. 31, 2019

(86) PCT No.: PCT/US2019/016075
§ 371 (c)(1),
(2) Date: Jul. 28, 2021

(87) PCT Pub. No.: WO2020/159516
PCT Pub. Date: Aug. 6, 2020

(65) Prior Publication Data
US 2022/0108564 A1      Apr. 7, 2022

(51) Int. Cl.
*G07C 5/00* (2006.01)
*G07C 5/08* (2006.01)
*G08G 1/00* (2006.01)

(52) U.S. Cl.
CPC ............ *G07C 5/006* (2013.01); *G07C 5/008* (2013.01); *G07C 5/0816* (2013.01); *G08G 1/20* (2013.01)

(58) Field of Classification Search
CPC .................................................. G07C 5/006
See application file for complete search history.

(56) References Cited

U.S. PATENT DOCUMENTS

| 9,591,514 | B2 * | 3/2017 | Bruner | H04L 65/80 |
|---|---|---|---|---|
| 10,629,067 | B1 * | 4/2020 | Komoni | G01S 5/0264 |
| 2016/0127934 | A1 | 5/2016 | Lauer et al. | |
| 2016/0255661 | A1 * | 9/2016 | Siraj | H04W 76/10 370/338 |
| 2017/0356751 | A1 | 12/2017 | Iagnemma et al. | |
| 2019/0012851 | A1 * | 1/2019 | Korchev | G07C 5/0808 |
| 2021/0089055 | A1 * | 3/2021 | Tran | B64U 10/30 |
| 2022/0015102 | A1 * | 1/2022 | Gallagher | H04B 7/1855 |
| 2022/0101657 | A1 * | 3/2022 | Lad | H04W 24/06 |
| 2022/0317290 | A1 * | 10/2022 | Kostanic | G01S 5/0246 |

OTHER PUBLICATIONS

International Search Report and Written Opinion, PCT/US2019/016075 dated Apr. 5, 2019, 13 pages.

* cited by examiner

*Primary Examiner* — Jean Paul Cass
(74) *Attorney, Agent, or Firm* — Holland & Hart LLP

(57) ABSTRACT

A communication service monitoring system includes one or more network communication devices and control circuitry configured to receive communication service data from one or more network communication devices. The communication service data is related to a communication service provided onboard a first vehicle. The control circuitry is further configured to, in response to receiving the communication service data, proactively detect, based at least in part on the communication service data, a performance issue related to the communication service, generate a message comprising a description of the performance issue, establish a network connection with each of one or more service access devices onboard the first vehicle using at least one of the one or more network communication devices, and transmit the message, via the network connection, to at least one of the one or more service access devices.

15 Claims, 9 Drawing Sheets

Customer PEDs  | Flight: DDD ×  |  | | | | | | | 🗨 MESSAGE ALL

| Name | Flight | Seat | Class | Connected | Plan | Freq Flyer | Manufacturer | Device | OS | Browser |
|---|---|---|---|---|---|---|---|---|---|---|
| A. Adams | DDD | 12A | F | 1h 22m | Monthly | 1234567890 | Co. A | A1 | AOS1 | XYZ |
| A. Atkins | DDD | 23C | F | Impaired | 1 Hour |  | Co. A | A1 | AOS2 | ABC |
| A. Adams | DDD | 16C | C | 1h 22m | Annual | 1234567890 | Co. A | A1 | AOS1 | XYZ |
| B. Butler | DDD | 5D | F | Impaired | 1 Flight |  | Co. A | A1 | AOS2 | ABC |
| B. Bean | DDD | 32F | Y | 2h 22m | Monthly | 1234567890 | Co. B | B1 | BOS1 | XYZ |
| C. Connors | Flight | 1D | F | 1h 22m | 1 Flight | 1234567890 | Co. A | A1 | AOS1 | ABC |
| C. Curran | Flight | 5D | C | 3h 55m | Monthly |  | Co. A | A1 | AOS2 | ABC |
| D. Dunne | Flight | Seat | F | 55m | 1 Hour |  | Co. A | A1 | AOS1 | ABC |
| S. Simmons | Flight | Seat | C | Impaired | 1 Flight | 1234567890 | Co. X | X1 | XOS1 | ABC |
| P. Perkins | Flight | Seat | F | 22m | 1 Hour |  | Co. A | A2 | AOS1 | XYZ |
| R. Roberts | Flight | Seat | C | 2h 32m | Monthly | 1234567890 | Co. A | A1 | AOS2 | ABC |
| Unknown | Flight | Seat | Y | 14m | Free |  |  | A2 | AOS1 | ABC |
| Unknown | Flight | Seat | Y | 46m | Free |  |  | A1 | AOS2 | XYZ |
| Unknown | Flight | Seat | Y | 24m | Free |  |  | A2 | AOS2 | ABC |
| V. Vickers | Flight | Seat | C | 1h 2m | Monthly | 1234567890 | Co. A | A1 | AOS2 | ABC |
| W. Williams | Flight | Seat | F | 45m | 1 Hour |  | Co. A | A2 | AOS1 | XYZ |

*FIG. 6*

MESSAGING OF COMMUNICATION SERVICE ISSUES TO VEHICLE CREW AND PASSENGERS

CROSS REFERENCE

The present Application is a 371 national phase filing of International Patent Application No. PCT/US19/016075 by O'Sullivan entitled "Messaging of Communication Service Issues To Vehicle Crew and Passengers" filed Jan. 31, 2019, which is assigned to the assignee hereof and is hereby incorporated by reference in its entirety.

BACKGROUND

The present disclosure relates generally to mobile communications systems, and more particularly to monitoring mobile platform (e.g., vehicle) communication systems and communicating detected performance issues to users onboard the mobile platform.

As high-performance networking capabilities have been made available to mobile platforms, managing network performance and user satisfaction for these networks has increased in complexity. Therefore, improved methods of characterizing and communicating the performance of network communication services to mobile platforms are needed.

SUMMARY

In some implementations, the present disclosure relates to a communication service monitoring system comprising one or more network communication devices and control circuitry configured to receive communication service data from one or more network communication devices. The communication service data is related to a communication service provided onboard a first vehicle. The control circuitry is further configured to, in response to receiving the communication service data, proactively detect, based at least in part on the communication service data, a performance issue related to the communication service, generate a message comprising a description of the performance issue, establish a network connection with each of one or more service access devices onboard the first vehicle using at least one of the one or more network communication devices, and transmit the message, via the network connection, to at least one of the one or more service access devices.

At least one of the one or more network communication devices may be a modem, a wireless access point, a satellite, an on-ground server, or a server onboard the first vehicle. In some embodiments, the performance issue represents an ongoing decrease of performance of the communication service. The ongoing decrease of performance may involve a failure of a first service access device of the one or more service access devices to present media content provided by the network communication devices. The message may be transmitted to the first service access device or to a second service access device of the one or more service access devices.

In some embodiments, the communication service data may comprise a first set of data, received from a first service access device of the one or more service access devices, related to a first performance metric. The ongoing decrease of performance may involve a failure of the first set of data to satisfy stored threshold values related to the first performance metric. The message may include instructions to restart the first service access device.

The communication service data may comprise a first set of data, received from a first network communication device of the one or more network communication devices, related to a first performance metric. In some embodiments, the ongoing decrease of performance involves a failure of the first set of data to satisfy stored threshold values related to the first performance metric. The message may include instructions to restart the first network communication device. The ongoing decrease of performance may involve a communication failure between the one or more service access devices and the one or more network communication devices. In some embodiments, the ongoing decrease of performance involves a data rate value of the communication service falling below a threshold data rate value. The control circuitry may be further configured to determine that the performance issue has occurred at each service access device of a plurality of service access devices onboard the first vehicle and determine that each service access device of the plurality of service access devices is located nearer to a first wireless access point than to a second wireless access point. The message may comprise instructions to connect to the second wireless access point.

In some embodiments, the performance issue may represent an expected future decrease of performance of the communication service. The control circuitry may be further configured to obtain, via the network connection, location data indicating a geographic location of the first vehicle. In some embodiments, the control circuitry is further configured to obtain communication service data collected during one or more trips of a fleet of one or more vehicles not including the first vehicle and determine, based at least in part on the communication service data, a geographic area associated with performance issues. Detecting the performance issue may involve determining, based at least in part on the geographic location of the first vehicle, a time range when the first vehicle is expected to be positioned in the geographic area. The message may comprise an indication of the time range.

The message may be transmitted via one or more of a mobile application, a web application, a text message, and an e-mail. In some embodiments, at least part of the control circuitry is located remotely from the first vehicle. At least part of the control circuitry may be located onboard the first vehicle. In some embodiments, the control circuitry is further configured to establish a first network connection with a first service access device of the one or more service access devices and establish a second network connection with a second service access device of the one or more service access devices. The second network connection may have a higher priority level than the first network connection and the message may be transmitted via the second network connection. In some embodiments, the control circuitry may be further configured to receive a response to the message. The control circuitry may be further configured to proactively generate, based at least in part on the communication service data, status levels for the communication service data.

In some implementations, the present disclosure relates to a method comprising receiving communication service data from one or more network communication devices. The communication service data is related to a communication service provided onboard a first vehicle. The method further comprises, in response to receiving the communication service data, proactively detecting, based at least in part on the communication service data, a performance issue related to the communication service, generating a message comprising a description of the performance issue, establishing a network connection with each of one or more service access devices onboard the first vehicle using at least one of the one or more network communication devices, and transmitting the message, via the network connection, to at least one of the one or more service access devices.

At least one of the one or more network communication devices may be a modem, a wireless access point, a satellite, an on-ground server, or a server onboard the first vehicle. In some embodiments, the performance issue may represent an ongoing decrease of performance of the communication service. The ongoing decrease of performance may involve an inability of a first service access device of the one or more service access devices to play media content provided by the communication service. The message may be transmitted to the first service access device. In some embodiments, the message is transmitted to a second service access device of the one or more service access devices.

The communication service data may comprise a first set of data, received from a first service access device of the one or more service access devices, related to a first performance metric. The ongoing decrease of performance may involve a failure of the first set of data to satisfy stored threshold values related to the first performance metric. The message may include instructions to restart the first service access device.

In some embodiments, the communication service data comprises a first set of data, received from a first network communication device of the one or more network communication devices, related to a first performance metric. The ongoing decrease of performance may involve a failure of the first set of data to satisfy stored threshold values related to the first performance metric. The message may include instructions to restart the first network communication device. The ongoing decrease of performance may involve a communication failure between the one or more service access devices and the one or more network communication devices.

The ongoing decrease of performance may involve a data rate value of the communication service falling below a threshold data rate value. In some embodiments, the method further comprises determining that the performance issue has occurred at each service access device of a plurality of service access devices onboard the first vehicle and determining that each service access device of the plurality of service access devices is located nearer to a first wireless access point than to a second wireless access point. The message may comprise instructions to connect to the second wireless access point.

In some embodiments, the performance issue represents an expected future decrease of performance of the communication service. The method may further comprise obtaining, via the network connection, location data indicating a geographic location of the first vehicle. In some embodiments, the method further comprises obtaining service data collected during one or more trips of a fleet of one or more vehicles not including the first vehicle; and determining, based at least in part on the service data, a geographic area associated with performance issues. Proactively detecting the performance issue may involve determining, based at least in part on the geographic location of the first vehicle, a time range when the first vehicle is expected to be positioned in the geographic area. The message may comprise an indication of the time range.

The message may be transmitted via one or more of a mobile application, a web application, a text message, and an e-mail. In some embodiments, at least one of the one or more network communication devices is located remotely from the first vehicle. At least one of the one or more network communication devices may be located onboard the first vehicle. In some embodiments, the method further comprises establishing a first network connection with a first service access device of the one or more service access devices and establishing a second network connection with a second service access device of the one or more service access devices. The second network connection may have a higher priority level than the first network connection. The message may be transmitted via the second network connection. In some embodiments, the method further comprises receiving a response to the message.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 6 illustrates a graphical interface representing a table view of status levels of individual service access devices onboard a vehicle in accordance with one or more embodiments.

DETAILED DESCRIPTION

Figure 1:
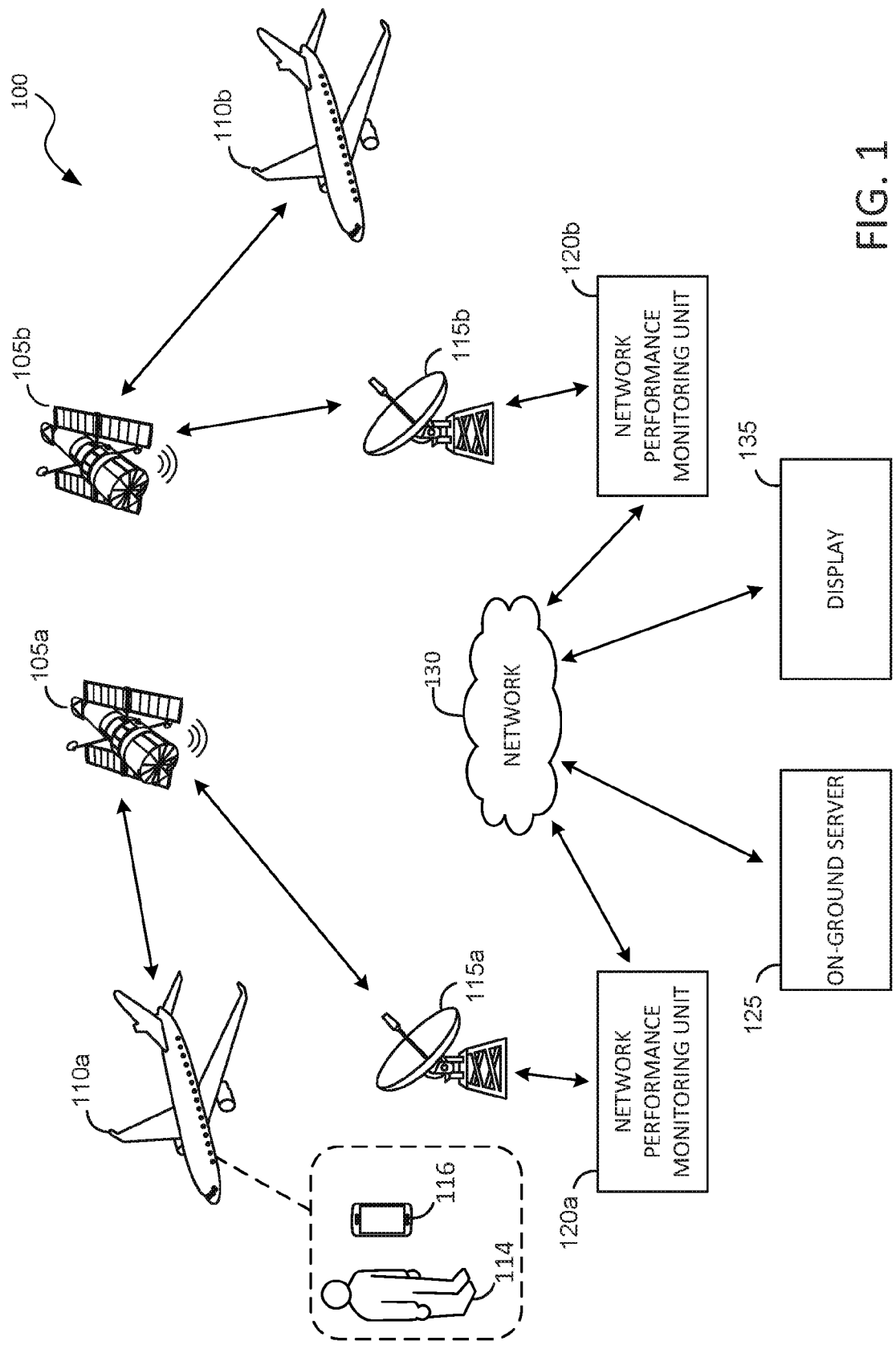
FIG. 1 is a diagram of a network communications system in accordance with one or more embodiments.

The headings provided herein are for convenience only and do not necessarily affect the scope or meaning of the claimed invention. In certain implementations, the present disclosure relates to systems, devices and methods for monitoring network communication systems and services onboard vehicles.

Overview

Aircrafts and other vehicles may be equipped with onboard systems configured to provide communication services, such as wireless network services, to service access devices onboard the vehicle. The user experience with respect to consumption of media or other content using such communication services on a trip of the vehicle can be affected by the performance of the communication service, which may be related to and/or measured by various communication service data. The term "trip," as used herein may refer to a travel segment and/or a period of time or space of travel between a beginning and ending of a travel segment of a vehicle and may include any flight, voyage, cruise, or excursion taken by or otherwise associated with a vehicle, such as an aircraft. "Communication service data" may be any data representing performance of a communication service on a vehicle and may include data sets related to a variety of performance metrics, including number or average number of dropped packets, average throughput or delays during a time period, availability of the communication service during a time period, data rate values, signal quality values, latency, packet loss rate, and number of service access devices (e.g., personal electronic devices (PEDs), seatback entertainment systems, crew member devices, etc.) connected to the communication service. Communication service data may further include location data and/or data relating to health of various network communication devices onboard the vehicle, including wireless access points (WAPs), modems, antennas, etc.

Embodiments disclosed herein relate to the detection of performance issues (e.g., using communication service data) and transmission of messages to passengers and/or crew of vehicles relating to the detected performance issues. In some embodiments, performance issues may be detected by analysis of communication service data associated with a communication service provided on a vehicle during one or more trips. Location data and/or route data of the vehicle during the one or more trips may be included in the communication service data and may be used to detect performance issues. Detection of performance issues and/or transmission of messages related to the detected performance issues may be performed proactively (e.g., without requiring a notification or indication from a user such as a passenger, or other user input) and/or predictively (e.g., prior to an expected future issue). In some embodiments, a performance issue may represent an expected future decrease of service performance and/or an ongoing decrease of service performance of the communication service.

In some implementations, embodiments of the present disclosure provide for the generation, provision, and/or presentation of graphical interface data representing certain location data, trip data, vehicle data, and/or messaging data indicative of performance issues related to service performance, as well as one or more icons or links associated therewith. The terms "graphical interface data" and "interface data," as used herein, may refer to any data in a computer system that is related to the representation of one or more graphical user interfaces or portions thereof, and may include data and/or code providing instructions for generation and/or display/presentation of text, various graphical icons, and other visual identifiers and/or features in a display device. For example, graphical interface data may represent messages including text, various graphical icons, and/or other visual identifiers or features to provide information relating to a communication service provided onboard a vehicle. Moreover, "graphical interface data" may refer to any type of user interface pages or portions of pages having any type of content. For example, graphical interface data may refer to a page of a website, a page of a network-enabled application, or the like, or to any type of code used by a user interface to generate some or all of a webpage, content page, or interface. Graphical interface data may comprise code conforming to any suitable or desirable language, such as hypertext markup language (HTML) code, Java or Javascript code, Android code, iOS code, other embedded device operating system code, or the like.

In some embodiments, some interface data may be generated, provided, and/or presented representing a map of a geographic area, wherein the map is configured to serve as a menu for selection by a user to allow access to various communication service data, including performance issues related to a communication service onboard a vehicle during a trip. Features of the map (e.g., vehicle icons) may indicate status levels and/or detected performance issues related to particular vehicle and/or trips represented in the interface data. Aircrafts or other vehicles may be represented on the map by icons or other visual identifiers at locations on the map corresponding to their respective physical locations. User input, such as a click, tap, hover, or the like, associated with an icon representing a vehicle may trigger, or result in, the generation, provision, and/or presentation of graphical interface data related to a communication service provided on the vehicle and/or associated hardware device(s) with respect to one or more trips of the vehicle. Certain visual features of a vehicle icon may indicate a status level of hardware device(s) and/or the communication service (including individual performance metrics of the communication service) provided on the vehicle, and therefore a user may be prompted to execute user input associated with a vehicle icon, or may otherwise be notified of communication service status levels, based on the visual feature(s) of the vehicle icon. By allowing for user input and interaction associated with vehicle icons on a map, a user may be able to generate and/or transmit messaging interfaces comprising descriptions of detected issues, instructions for responding to detected performance issues, and/or response fields. In some embodiments, messaging interfaces may be generated and/or transmitted automatically in response to automatic performance issue detection, without requiring user input and/or manual detection of performance issues. Users may also be able to link to communication service data for vehicles in a particular geographic area through interaction or engagement with vehicle icons represented on the map in the geographic area.

In some embodiments, some interface data may be generated, provided, and/or presented representing a message and/or a notification including information related to a performance issue for a communication service provided onboard a vehicle. For example, the interface data may include an explanation of a previous, current (i.e., ongoing), and/or expected performance issue and may further include instructions for responding to the performance issue. The terms "issue" or "performance issue," as used herein, may refer to any disruption, failure, anomaly, decrease in performance, and/or other noteworthy event related to a communication service. In some embodiments, a performance issue may be indicative of a decrease or increase in monitored values of the communication service data. In one example, a performance issue may represent a decrease of aggregate data rate values for transmission of data between a server and a set of devices (e.g., all personal electronic devices onboard a vehicle). In another example, a performance issue may represent an impaired state of a network device, for example a WAP, satellite, on-ground server, onboard server, modem and/or service access device (e.g., a PED). In another example, a performance issue may represent a failure of communication between a network device and a service access device. In some embodiments, messaging data (e.g., a description of a performance issue, instructions for responding to the performance issue, options for responding to the performance issue, etc.) relating to a particular performance issue may be generated for inclusion in a messaging interface (see, e.g., FIG. 7). Messaging data may be generated based on communication service data and/or location data relating to one or more vehicles and/or trips.

Communication service data associated with a communication service provided on a vehicle may include any type of communication-service-related information associated with the vehicle, including health data for network devices (e.g., modems, WAPs, antennas, servers, etc.), number of service cases opened within a certain period of time, and/or hardware replacement and/or maintenance history. Such information may be used in detecting performance issues. For example, detecting a performance issue may involve determining that a network device is in an impaired state.

Communication service data may further include any type of communication-service-related information associated with a trip of a vehicle, including location data, route data, and/or vehicle passenger experience reporting events. Communication service data may include data related to any of a variety of performance metrics. Performance metrics may include data rate, latency, number of service access devices connected, number or average number of dropped packets, average throughput or delays during a time period, availability of the communication service during a time period, signal quality values, packet loss rate, and/or a maximum number of service access devices connected. In some embodiments, visual feature(s) of a vehicle icon provide an indication of aggregated communication service data. Such visual features may, for example, indicate status levels of a communication service system provided onboard the vehicle (e.g., "good," "fair," "poor," or other categorization). In some embodiments, a "poor" status level may result in and/or correlate to a detected performance issue.

Embodiments herein provide for improved detection and communication of performance issues through use of monitored and/or aggregated communication service data. Some embodiments provide interfaces for presenting communication service data to allow users to quickly and effectively diagnose and/or detect issues. In some embodiments, issues may be detected automatically and/or preemptively based on monitored communication service data. For example, in response to detecting decreased performance of a communication service, a performance issue may be detected and messaging related to the detected performance issue may be performed. Messages may be generated automatically upon detection of a performance issue and may be transmitted to passengers and/or crew members on affected vehicles to facilitate in responding to detected performance issues. Detecting a performance issue may not require any input/feedback from users and may rely exclusively on monitored communication service data related to a communication service provided onboard a vehicle.

Embodiments herein further provide for messaging to passengers and/or crew members of vehicles relating to detected performance issues. Messages may advantageously alert passengers and/or crew members to ongoing performance issues (including expected future decreases in service performance) to assist passengers and/or crew members in responding to and/or correcting an ongoing performance issue. In some embodiments, messages may provide details regarding future performance issues to assist passengers in preparing for and/or responding to the performance issues. As described herein, messages may be generated and/or transmitted automatically and/or users may create and/or request transmission of messages. Performance issues may be detected predictively (e.g., before a user experiences or recognizes performance problems) and/or proactively (e.g., without requiring any communication from users).

Communications System

In some implementations, the present disclosure relates to systems, methods, and devices that provide for monitoring of communication services and systems to proactively detect issues related to the communication services and systems. The communication services may be provided to various devices onboard a vehicle. Monitoring of the communication services and systems may involve monitoring of: devices onboard the vehicle and/or communication service data related to performance metrics of a communication service provided to the vehicle (e.g., from an on-ground server and/or a server onboard the vehicle). The present disclosure further relates to generating and/or transmitting messages based on the detected issues. FIG. 1 illustrates a communications system 100, which provides a context for various embodiments disclosed herein. Many other configurations are possible having more or fewer components than the communications system 100 of FIG. 1.

In the illustrated embodiment, the communications system 100 includes a plurality of vehicles 110*a-b*, shown as airplanes in FIG. 1 for convenience, which are in communication with a terrestrial network 130 via one or more satellites 105*a-b* and one or more network gateways 115*a-b*. Although FIG. 1 illustrates airplanes, it should be understood that the each of the vehicles 110*a-b* may be any type of vehicle, as described in greater detail below. Each of the vehicles 110*a-b* may include a two-way communication system to facilitate bidirectional communication with one of the one or more satellites 105*a-b* (or other type of access network, such as an air-to-ground network). In some embodiments, each of the vehicles 110*a-b* may be associated with one or more network service areas based on a present location of the vehicles 110*a-b* (see, e.g., FIG. 4B). For example, in some embodiments, if a vehicle 110*a-b* is within a geographic area associated with a first network service area of the one or more network service areas, then the vehicle 110*a-b* may be associated with the first network service area. Similarly, if a vehicle 110*a-b* is expected to pass through the first network service area, then the vehicle 110*a-b* may be associated with the first network service area. For example, trip data of the vehicle 110*a-b* may include route data indicating that the vehicle 110*a-b* will pass through the first network service area. Performance issues related to a particular network service area (e.g., an impaired satellite 105*a-b* providing service to the network service area) may be used in detecting performance issues for vehicles 110*a-b* associated with the network service area. For example, a detected "poor" status level of a satellite 105*a-b* may result in detection of a performance issue for a vehicle associated with a network service area serviced by the satellite 105*a-b*.

One or more users 114 (e.g., passengers, crew members) may be onboard each of the vehicles 110*a-b* and may use one or more service access devices 116 (e.g., PEDs, seatback entertainment systems, crew member devices, etc.) to access the communication service provided onboard the vehicles 110*a-b*. Via the communication service, the service access devices 116 may transmit and/or receive messages and/or responses to messages. In some embodiments, the service access devices 116 may communicate with an onboard server which may in turn be in bi-directional communication with an on-ground server 125. Message interfaces and/or message data may be sent to the PEDs 116 from the onboard server and/or the on-ground server 125.

The vehicles 110*a-b* may be in communication with the on-ground server 125 via the network 130. In some embodiments, a respective network performance monitoring unit 120*a-b* may be positioned in a communication path between the vehicles 110*a-b* and the network 130, so as to monitor forward and/or return link performance of service provided to the vehicles 110*a-b*.

In some embodiments, the network 130 may represent a variety of domains and/or connection paths. For example, the on-ground server 125 may communicate with crew members onboard the vehicles 110*a-b* via a first network connection and with passengers onboard the vehicles 110*a-b* via a second network connection. In some embodiments, different network connections have different priority levels. For example, during periods of poor network conditions, data transmitted over a first network connection (e.g., a connection accessible to crew members) may be received at a vehicle while data transmitted over a second network connection (e.g., a connection accessible to passengers) may be restricted at the vehicle to prioritize network resources for the first network connection. Accordingly, some service access devices 116 (e.g., PEDs) may not receive communications from the on-ground server 125 while other service access devices (e.g., crew member devices) may continue to receive communications from the on-ground server 125. Accordingly, during poor network conditions, messages may be sent only via a first (e.g., secured) network connection (e.g., a crew member connection). Messages may include instructions to relay certain information to users who may be unable to access the first network connection. For example, a message may instruct crew members on a vehicle 110*a-b* to inform passengers that one or more WAPs on the vehicle 110*a-b* may be experiencing connection issues and to switch to a different WAP.

Each of the vehicles 110*a-b* may be any type of vehicle, such as an airplane, a train, a bus, a cruise ship, an automobile, etc. As illustrated, the network 130 can be any type of network and can include, for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 130 can include both wired and wireless connections, as well as optical links.

While two vehicles 110*a-b* are shown in communication with the network 130 via two satellites 105*a-b*, techniques described herein can be applied in many other communications environments without departing from the scope of the inventions. Any or all such vehicle(s) 110*a-b* can communicate via any of one or more suitable communications architecture(s), including any suitable communications links or access networks, such as satellite communications systems, air-to-ground communication systems, hybrid satellite and air-to-ground communications systems, cellular communications systems, etc. Typically, because of the mobile nature of the vehicles 110*a-b*, the communications architecture will likely involve at least one wireless communications link.

The on-ground server 125 may include one or more electronic hardware computers or components, including control circuitry configured to perform certain functionalities, as discussed in greater detail below. The vehicles 110*a-b* may be configured to transmit vehicle-specific communication service data indicating one or more characteristics of communication service performance (e.g., network communication service) experienced onboard the vehicle while the associated onboard server is serviced by a particular network service area. The vehicle-specific communication service data may be transmitted or transferred from the vehicles 110*a-b* to the one or more satellites 105*a-b*, and further to one of the one or more gateways 115*a-b*, to the network 130, and to the on-ground server 125.

In some embodiments, the vehicles 110*a-b* may include position determination device(s), such as an inertial measurement unit (IMU) or global positioning system (GPS). Such devices, if installed, may allow the vehicle to determine its physical location, wherein such location data may be utilized by the on-ground server 125 in performing certain functionality disclosed herein. Alternatively, other techniques for determining a vehicle's location may be used. For example, in embodiments in which the satellite 105*a-b* is a spot beam satellite, a vehicle 110*a-b* may be able to derive its location based on the spot beam being used to communicate with the satellite network. In some embodiments, the vehicle 110*a-b* may transmit location data to the on-ground server 125. The location data may be included with vehicle-specific communication service data that is collected near or at the reported position. This may allow the on-ground server 125 to correlate particular vehicle-specific communication service data with specific network service areas based on the associated position. In some embodiments, location data for one or more of the vehicles 110*a-b* is obtained by the on-ground server 125 from a separate entity or server not shown in the diagram of FIG. 1, wherein such entity or server may receive location data from the vehicle(s) or otherwise derive the location data in some manner.

The on-ground server 125 may generate and/or provide graphical interface data for presentation on a display 135, for example at a monitoring station. In some embodiments, the display 135 may be a component of the on-ground server 125, while in other embodiments, the display 135 may connect to the on-ground server 125 via the network 130. The on-ground server 125 may provide user interface data for presentation on the display 135 similar to the example embodiments shown in FIGS. 4-8, discussed in detail below.

In some embodiments, one or more of the satellites 105*a-b*, gateways 115*a-b*, or other ground-based network equipment (not shown in FIG. 1) may be configured as the network performance monitoring units 120*a-b*, and thus may generate return link and/or forward link vehicle-specific communication service data. For example, in some embodiments, the network performance monitoring units 120*a-b* may be routers or other types of network equipment, and may be positioned at one end of a communication link providing network communication to a vehicle 110*a-b*. A router may be configured to determine vehicle-specific communication service data by filtering performance data transmitted over the communication link to include only performance data destined for or received from a particular vehicle. The router may determine return link and/or forward link vehicle-specific communication service data, such as return link and/or forward link latency, throughput, dropped packet count or percentage, retransmission count or percentage, jitter, or other indicators of vehicle-specific return link and/or forward link communication service performance. In these aspects, the satellites 105*a-b*, gateways 115*a-b*, or other ground-based network equipment may be configured to send the vehicle-specific communication service data to the on-ground server 125.

Communication Server

Figure 2:
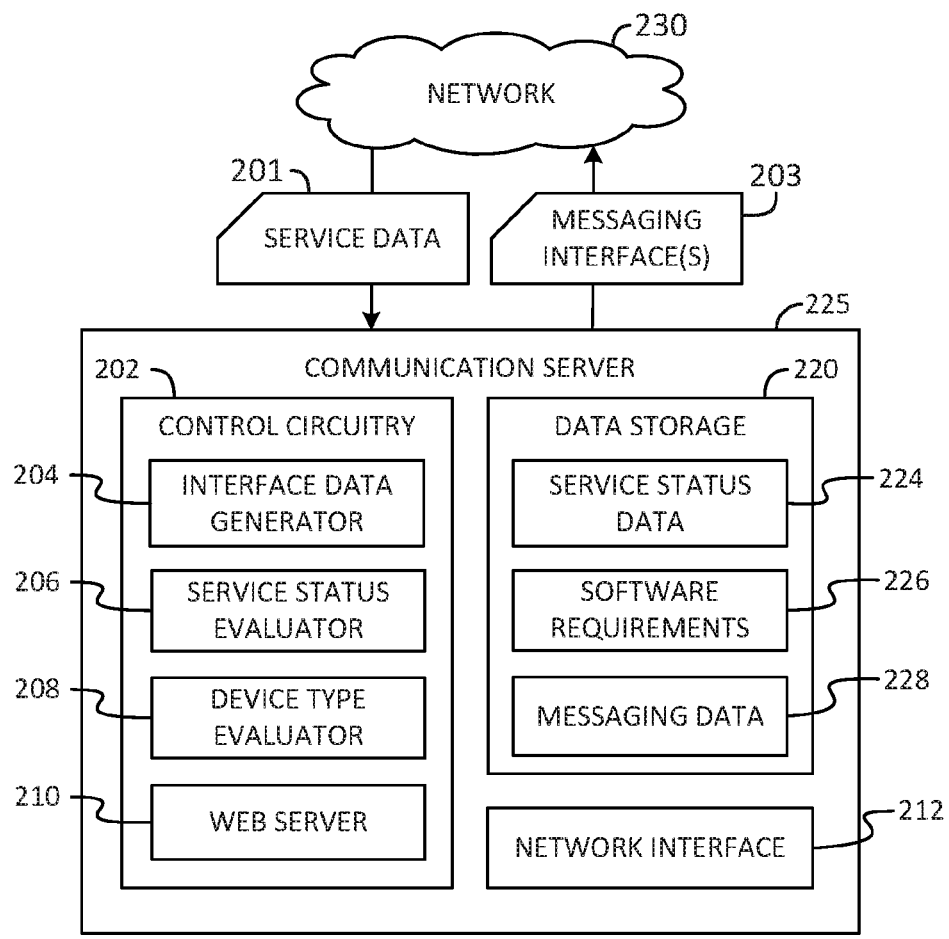
FIG. 2 is a block diagram illustrating a communication server in accordance with one or more embodiments.

FIG. 2 is a block diagram illustrating a communication server 225 in accordance with one or more embodiments.

The communication server 225 may be a server having at least some components onboard a vehicle and/or may represent an example embodiment of the on-ground server 125 shown in FIG. 1 and described above. Many other configurations of the communication server 225 are possible having more or fewer components than those illustrated in FIG. 2. In some embodiments, the communication server 225 may be comprised of multiple physical computers, which may be geographically distributed across a wide area (e.g., onboard a vehicle and on-ground) and connected via a network. In some embodiments, the communication server 225 comprises a single hardware computer contained within a single physical enclosure. In some embodiments, the communication server 225 is comprised of multiple physical enclosures, some of which are within a single physical enclosure and some of which are geographically distributed away from the single physical enclosure. Additionally, the functionalities described with respect to the communication server 225 can be distributed among the components of the system 100 of FIG. 1 in a different manner than shown or described herein.

With reference to FIG. 1, in some embodiments, communication service data for one or more vehicles 110*a-b* may be received by a satellite 105*a-b* for example, and then received by the on-ground server 125. In some embodiments, communication service data may be received at and/or transmitted from the communication server 225 via a satellite 105*a-b* for example. The illustrated components and features of the communication server 225, which represents an embodiment of the on-ground server 125 of FIG. 1, include control circuitry 202 and a network interface 212. The control circuitry 202 may be in communication with the network interface 212 via one or more electronic buses, or other connectivity features (not shown), of the communication server 225. The control circuitry 202 may communicate with the network interface 212 to transmit and/or receive packets over a network, such as a network providing connectivity to one or more vehicles and/or servers, such as the vehicles 110*a-b* and on-ground server 125 discussed above with respect to FIG. 1.

The control circuitry 202 may comprise one or more processors, volatile and/or non-volatile data storage devices, registers, amplifiers, filters, radio-frequency and/or baseband signal processing components, transceivers, device controllers, communication interfaces, and/or the like configured to perform certain functionality disclosed herein. The control circuitry 202 includes graphical interface data generator circuitry 204, communication service status evaluator circuitry 206, device type evaluator circuitry 208, and web server circuitry 210. The functionality of each of the illustrated functional components of the control circuitry 202 can be embodied in code stored or maintained in one or more volatile or nonvolatile data storage devices, which may be part of a virtual or physical memory space accessible to the control circuitry 202. For example, the interface data generator 204, service status evaluator 206, device type evaluator 208, and/or web server 210 may include code (e.g., binary data) defining instructions that configure the control circuitry 202 to perform the respective functions.

In some embodiments, the service status evaluator 206 may include instructions that configure the control circuitry 202 to collect communication service data for a communication service provided on a monitored vehicle, such as an aircraft. Communication service data may be indicative of performance metrics (e.g., data rate values, latency values, number of connected service access devices, etc.) for the communication service, location data of the vehicle, ongoing and/or historical communication service data for the monitored vehicle and/or other vehicles, and/or network device health data for devices onboard the vehicle. In some embodiments, collected communication service data may be stored in the data storage 220. Threshold (e.g., target) values for a variety of performance metrics may be stored in the data storage 220 as service status data 224. For example, the service status data 224 may include a threshold data rate value and any communication service data, including data rate values, received at the service status evaluator 206 for a communication service may be aggregated and/or compared to the threshold data rate value. If the received values are below the threshold value, the service status evaluator 206 may detect a performance issue related to the communication service and/or indicate that the communication service is in an "impaired" state.

In some embodiments, the service status evaluator 206 may aggregate communication service data for a communication service. For example, in some embodiments, the service status evaluator 206 may generate an average, maximum, minimum, mean, and/or median of communication service data for two or more performance metrics. The service status evaluator 206 may determine negative variances between communication service data of a vehicle being monitored as it proceeds along its travel route. Such negative variances may themselves be aggregated to produce summary metrics (for example, one metric) representing a difference in performance of a communication service of the monitored vehicle compared to threshold values. In some embodiments, aggregation of negative variances may be divided by the duration of the given trip to the present point to provide an average negative variance experienced during the trip.

The service status evaluator 206 may compare aggregated communication service data to threshold values, which may include threshold values for certain performance metrics. For example, threshold values may be stored as service status data 224, and may be accessed by the service status evaluator 206 or other component. The threshold values may include values associated with Service Level Agreements (SLAs) and/or other target performance measures of the communication service, and may represent a variety of measurement types. In one embodiment, a threshold value may represent a target data rate, or a target percentage of time the target data rate is achieved. The service status evaluator 206 may gather data rate statistics over a period of, for example, an entire trip of a vehicle and may compare the statistics to data rate threshold values stored in the data storage 220. Based on the comparison, the service status evaluator 206 may detect performance issues and/or generate a service status level (e.g., "impaired," "normal") for the vehicle.

In some embodiments, communication service data associated with one or more performance metrics may be compared against a multi-tiered threshold scheme, such as a two-tiered threshold scheme. For example, the service status data 224 may include a first threshold indicating that a first data rate should be achieved for at least a first percentage of a given trip, and a second (e.g., lower) data rate should be achieved for at least a second (e.g., lower) percentage of the trip. If both the first data rate and second data rate targets are met, the service status evaluator 206 may indicate a positive (e.g., "normal") status level, whereas if either or both of the first data rate and the second data rate targets are not met, the service status evaluator 206 may detect a performance issue and/or indicate a negative (e.g., "impaired") status level. The interface data generator 204 may use detected performance issues and/or indicated status levels from the service status evaluator 206 and/or communication service data to generate interface data including text, icons, and/or values with corresponding visual features based on the detected issues, indicated status levels, and/or communication service data.

The service status evaluator 206 may be configured to preemptively (e.g., relating to an expected future issue) and/or proactively (e.g., without requiring user input) detect performance issues with a communication service onboard a vehicle. Detection of issues may be based on received communication service data 201 and may not require user input, such as messages from users indicating a possible performance issue. In response to receiving the communication service data 201, the service status evaluator 206 or other component may proactively detect issues automatically without requiring user input or other prompts. In some embodiments, the service status evaluator 206 may detect issues based at least in part on one or more of vehicle location data, communication service data (e.g., received from one or more devices onboard the vehicle and/or remotely from the vehicle), and stored service status data 224 (e.g., threshold values). In this way, issues may be detected through analysis of communication service data and user action may not be required for detection of issues.

In some embodiments, an issue may be indicative of an expected decrease in communication service performance. An expected decrease in communication service performance may be detected based at least in part on a vehicle's location data, which may indicate a current position and/or direction of travel of the vehicle. For example, based on the vehicle's location data, it may be determined that the vehicle is likely to soon be in an area associated with service outages or other performance issues. In some embodiments, a current status level may be indicative of and/or cause detection of an issue related to a communication service. For example, an "impaired" status level may be indicative of an ongoing issue related to the communication service.

The control circuitry 202 may further include a device type evaluator 208 configured to detect issues associated with individual PEDs onboard a vehicle. In one example, an issue may involve an inability to render data from a communication service to a PED. For example, a particular smartphone may be unable to play a movie that is available through the communication service. In some embodiments, the inability to render data may be due, at least in part, to digital rights management (DRM) rules that may prevent access to certain digital content for a certain device based on the version of software installed on the device. For example, a software application installed on a smartphone may have a DRM that restricts the digital content than can be rendered via the application. Some digital content may require any of one or more particular types of operating systems in order to be rendered. Detection of issues based on device type may be performed predictively (e.g., before a user attempts to access digital content) and/or preemptively (e.g., without requiring user input/feedback). For example, the control circuitry 202 may determine, based on a type of PED (e.g., model, make, etc.) and/or software installed on the PED, that the PED may be incapable of rendering certain data and/or may experience other performance problems. In another example, if a PED is unable to render certain data, the control circuitry 202 may detect the inability to render the data at the PED without requiring a communication from a user of the PED.

DRM rules and/or other software requirements 226 may be stored in data storage 220. Software requirements 226 may include requirements for any content available via a communication service provided on a vehicle. In some embodiments, the service status evaluator 206 may be configured to collect software data for PEDs connected to the communication server 225. When a PED attempts to access digital content via the communication server 225, the service status evaluator 206 may retrieve the software requirements 226 for the selected content and compare the PEDs software data with the software requirements 226. If the software data does not match the software requirements 226, the interface data generator 204 may be configured to generate a message indicating that the digital content could not be accessed due to the software data of the PED. The message may further indicate digital content that is accessible with a specific PED's software data. The interface data generator 204 may access messaging data 228 for use in generating the message. For example, the messaging data 228 may store message content for use when a PED has a certain type of software data, and may include messages indicating that the software data is not compatible and providing types of content that are accessible for a specific PED's software data.

In some embodiments, the interface data generator 204 may be configured to generate a messaging interface (see, e.g., FIG. 6) based at least in part on stored messaging data 228 and/or issues detected at the service status evaluator 206 and/or device type evaluator 208. Messaging data 228 may include descriptions of issues, instructions for responding to issues, prompts for providing feedback, and other information. In one use case, messaging data 228 may include a text description of an issue related to a particular device (e.g., an onboard WAP, a remote satellite, a remote and/or on-ground server, an onboard server, and/or an onboard service access device). The text description may indicate that a device is unable to render certain digital content (e.g., content requested by the device) and/or may indicate types of digital content that can be rendered by the device. The message may further provide a link or input field for responding to the message. For an expected future issue, the messaging data 228 may include an indication of when a decrease of performance may occur and when the decrease of performance may end.

Messaging data 228 may include various instructions for responding to issues. In one example, messaging data 228 may instruct users to switch a service access device (e.g., PED, seatback system, crew member device etc.) connection from a first network device (e.g., a WAP) to a different network device, restart a network device (e.g., a modem and/or WAP) of the communication system and/or a service access device, replace a battery of a network device, access a different type of digital content, etc. In some embodiments, messaging data 228 may include instructions for selecting a device to use with respect to a communication service. In one example, due to a number of service access devices exceeding a threshold number of service access devices, the number of service access devices connected to a communication service may be restricted. Accordingly, passengers may be required to select one or more specific service access devices to connect to the communication service. A message may allow passengers to provide a response indicating which device the passenger selects.

The interface data generator 204 may be configured to generate response fields, links, and/or other content for responding to messages. For example, a message may inform a passenger that the passenger's PED is unable to access a first type of digital content (e.g., a movie). The message may ask the user to try to access a second type of digital content (e.g., television) and provide a response indicating whether the passenger is able to access the second type of digital content. The message may include multiple links or buttons, for example a first indicating a "yes" response, a second indicating a "no" response, and/or a third indicating an "unknown" response. In some embodiments, the service status evaluator 206 and/or other device may be configured to receive user responses to messages. In some embodiments, the communication server 220 may be configured to track how many messages are transmitted and/or how many responses are received.

Messages may be sent via any of a variety of platforms. In one use case, users may connect to a communication service via a software application, and messages may be sent via the software application. In another use case, messages may be sent via text message and/or e-mail using contact information collected from users. In some cases, messages may be sent to a device experiencing issues related to the communication service. For example, if a first PED is unable to play a certain type of media, a message may be sent to the first PED. In some cases, messages may be sent to a second device in response to a first device experiencing issues related to the communication service. For example, if a first PED is unable to establish a connection with a communication service, a message may be sent to a second PED (e.g., a PED belonging to a crew member) with instructions to inform the owner of the first PED that the first PED should connect to a different WAP or may need to be restarted.

The web server 210 may include instructions that configure the control circuitry 202 to provide a web-based user interface. The web-based user interface may provide the ability for a user to search communication service data to identify issues. Additionally, the web-based user interface may provide graphical interface data representing mappings of service access devices within a vehicle and indicating which of the service access devices, if any, is/are experiencing issues. The web server 210 may further be configured to generate and/or provide graphical interface data generated by the interface generator 204 to one or more remote or local monitoring systems for display and/or presentation to a user. The web server 210 may receive indications of user input in connection with a graphical interface, wherein generation of graphical interface data by the interface data generator 204 may be triggered by such user input indications, as described in detail below.

With reference to FIGS. 1 and 2, in certain embodiments, the web server 210 may provide web page data to the one or more vehicles 110a-b, and the service status evaluator 206 may collect communication service data indicating quality of experience (e.g., how quickly a web page loads) at the one or more vehicles 110a-b. For example, aggregated communication service data may indicate a number of seconds required, at the one more vehicles 110a-b, to load the web page data provided by the web server 210. The service status evaluator 206 may compare the aggregated communication service data to service status data 224 (e.g., a target maximum number of seconds) and provide indications of results (including, e.g., detected performance issues and/or status levels) to the interface generator 204.

Web page and/or website content may be copied to, and/or served at the web server 210. In this way, communication service data may be representative of performance of the communication network communicatively connecting the communication server 225 and the monitored vehicle, and may not be affected by performance issues that may affect transfer of content from the origin server (e.g., the server that created the website). The web server 210 may be a single server or may represent a distributed network of servers across a geographic area. The service status evaluator 206 may collect communication service data representative of a variety of content types, including flash pages, static content, and dynamically loaded content.

The communication server 225 may communicate bi-directionally with devices onboard a vehicle and/or outside a vehicle through a network 230. Via the network, the communication server 225 may obtain communication service data 201 from service access devices and/or network communication devices (e.g., WAPs, modems, on-ground servers, onboard servers, etc.). Communication service data 201 may include performance metric data device types (e.g., smartphone, laptop computer, etc.), installed software, browser, etc. The communication server 225 may be configured to transmit, via the network 230, messaging interfaces 203 generated, for example, by the interface data generator 204. The messaging interfaces 203 may include messages (e.g., text messages, media, etc.) and/or instructions for displaying messages in a display.

Vehicle Onboard Communication Service System

Figure 3:
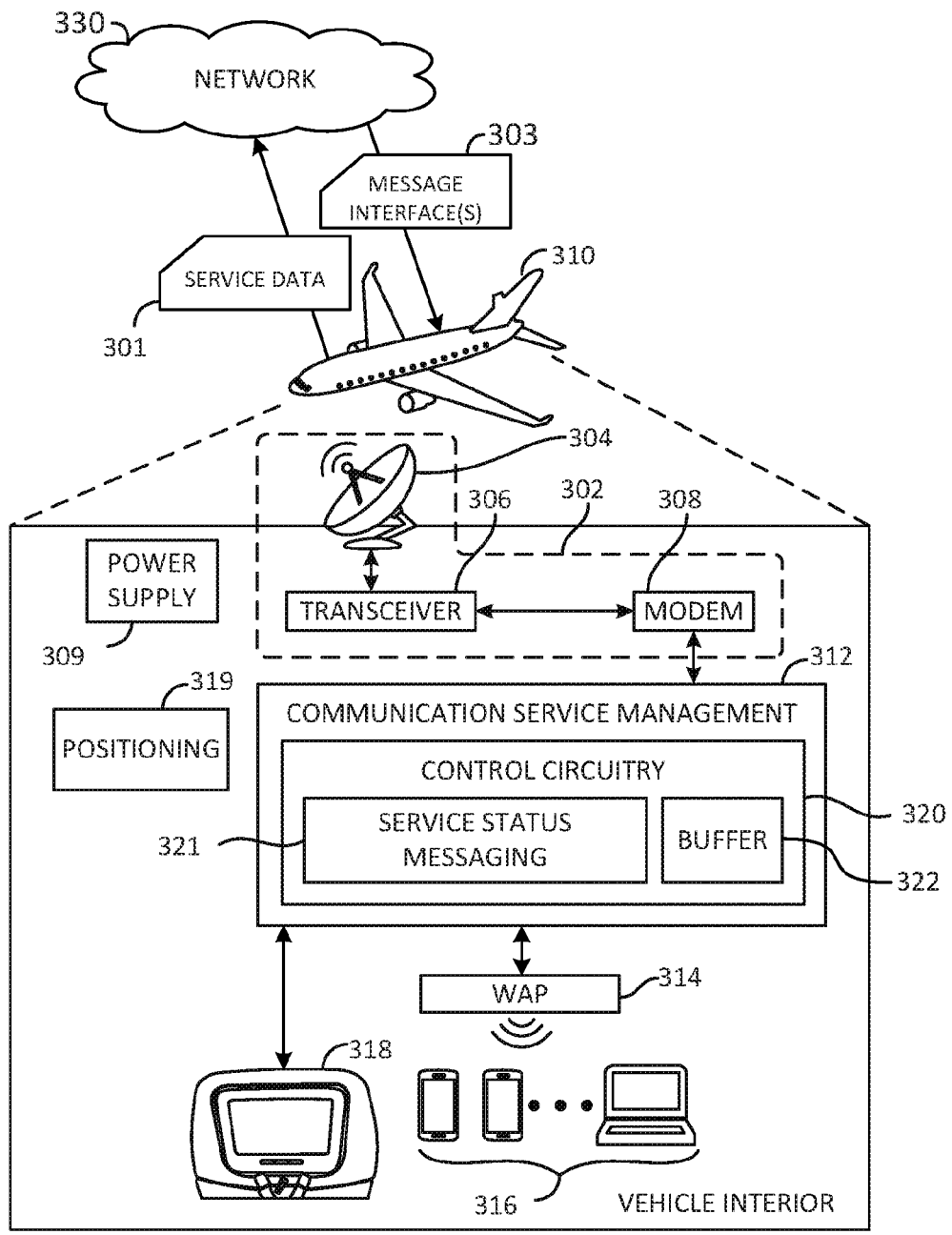
FIG. 3 is a diagram illustrating a vehicle interior in accordance with one or more embodiments.

FIG. 3 is a diagram illustrating a vehicle 310 in accordance with one or more embodiments. The vehicle 310 represents an example embodiment of one of the vehicles 110a-b shown in FIG. 1 and described above. The vehicle 310 may include various hardware devices, including one or more antennas 304, a transceiver 306, a modem 308, a power supply 309, communication service management system 312, one or more wireless access points (WAPs) 314, as well as one or more onboard service access devices, which may include PEDs 316, crew member devices, and/or passenger seat-back media systems 318. The antenna 304, transceiver 306, and modem 308 may comprise a two-way communication system 302 that may be configured to facilitate bidirectional communication with a satellite (e.g., one of satellites 105a-b in FIG. 1).

The two-way communication system 302 can provide for reception of a forward downlink signal from a satellite and transmission of a return uplink signal to the satellite to support two-way data communications between service access devices within the vehicle 310 and a terrestrial network (e.g., the Internet). The PEDs 316 can include smartphones, laptops, tablets, netbooks, and the like brought onto the vehicle 310 by passengers or crew members. The PEDs 316, crew member devices, and/or seat back systems 318 can communicate with the communication service management system 312 via a communication link that can be wired and/or wireless. The communication link can be, for example, part of a local area network such as a WLAN supported by the one or more WAPs 314. WAPs 314 can be distributed about the vehicle 310, and can provide traffic switching and routing functionality; for example, as part of a WLAN extended service set (ESS), etc.

In operation, the communication service management system 312 installed within the vehicle 310 can provide uplink data received from the PEDs 316 and/or seatback systems 318 to the modem 308 to generate modulated uplink data (e.g., a transmit intermediate frequency (IF) signal) for delivery to the transceiver 306. The transceiver 306 can upconvert and then amplify the modulated uplink data to generate the return uplink signal for transmission to the satellite 105 via the antenna system 304. Similarly, the transceiver 306 can receive the forward downlink signal from a satellite via the antenna(s) 304. The transceiver 306 can amplify and down-convert the forward downlink signal to generate modulated downlink data (e.g., a receive IF signal) for demodulation by the modem 308. The demodulated downlink data from the modem 308 can be provided to the communication service management system 312 for routing to the PEDs 316. The modem 308 can be integrated with a service status messaging unit 321 of the communication service management system 312, or can be a separate component in some examples.

The service status messaging unit 321 may include, in some embodiments, one or more electronic hardware processors and/or electronic hardware memory devices, and one or more network interfaces. The electronic hardware processor may be configured to perform a variety of functions associated with monitoring the network performance of the communication service with respect to the vehicle 310.

The communication service management system 312 may include, in some embodiments, control circuitry 320 comprising the service status messaging unit 321 and a data buffer 322. The control circuitry 320 may be configured to perform a variety of functions associated with messaging related to the communications service provided on the vehicle 310 by the communication system 302 and the communication service management system 312.

In some embodiments, the communication service management system 312 may be configured to detect performance issues and/or generate status levels using received communication service data associated with the communication service provided on the vehicle 310 by the communication system 302 and the communication service management system 312, and transmit indications of the detected performance issues and/or the status levels over an access network. The communication service data, performance issues, and/or status levels may be vehicle-specific data and/or trip-specific data. One or more metrics included in the communication service data representing the measured performance of the communication service provided on the vehicle 310 may be generated by the communication service management systems 312. Performance issues may be detected and/or status levels may be generated proactively (e.g., automatically without requiring user input) in response to communication service data received from the WAPs 314, modem 308, transceiver 306, seatback systems 318, and/or PEDs 316. For example, performance issues may be detected immediately upon receipt of communication service data and indications of the performance issues may be sent immediately upon detection of the performance issues. In some embodiments, status levels may comprise one or more indications of a level of performance (e.g., "good," "impaired," "unknown") of the communication service. Level of performance may be determined by comparison of communication service data to threshold values.

In some embodiments, the communication service data may indicate one or more metrics, the one or more metrics including one or more of a number or average number of dropped packets, average throughput or delays during a time period, an availability of the communication service during a time period, data rate, signal quality values, latency, packet loss rate, and/or a maximum number of service access devices connected, among others, with respect to the communication service. In some embodiments, the availability of network service may be represented as a percentage of time that network service was available to the communication service management system 312. In some embodiments, the vehicle-specific communication service data may indicate an availability of one or more of uplink and/or downlink communications.

The communication service management system 312 (e.g., specifically, the service status messaging unit 321) may be further configured to periodically re-determine status levels of one or more of the metrics described above. For example, in some embodiments, a moving average of one or more of the metrics may be determined at a periodic interval. In some embodiments, the communication service management system 312 may be further configured to periodically report one or more of the metrics to an on-ground server (e.g., the on-ground server 125 of FIG. 1 and/or the communication server 225 of FIG. 2). In some embodiments, the communication service management system 312 may be configured to calculate forward link communication service data, while another communication service management system installed off-board the vehicle 310 may be configured to calculate return link communication service data.

The communication service management system 312 (e.g., specifically, the service status messaging unit 321) may also be configured to monitor a location of the vehicle 310 and to periodically transmit location data of the vehicle 310 over the access network to the on-ground server. For example, the vehicle 310 may comprise positioning circuitry 319, such as Global Positioning System (GPS) circuitry, configured to determine a present location or position of the vehicle 310. In some embodiments, the service status messaging unit 321 may associate portions of communication service data with one or more vehicle 310 locations, and report the association to the on-ground server.

In some embodiments, the service status messaging unit 321 may be configured to generate messages based on communication service data, which may include location data. The service status messaging unit 321 may use the communication service data to generate status levels and/or detect performance issues associated with the communication service and generate messages related to the detected performance issues. Performance issues may be detected proactively (e.g., without user input and/or as soon as possible) in response to received communication service data. For example, detection of issues may be performed immediately upon receipt of communication service data. In some embodiments, the service status messaging unit 321 may be configured to generate and/or transmit a message including a description of and/or instructions for responding to a detected issue to a service access device (e.g., a PED 316). Generation and/or transmission of messages may be performed proactively in response to detection of issues. For example, generation of messages may be performed immediately in response to detection of issues and/or transmission of messages may be performed immediately upon generation of the messages. In optional embodiments, generated messages may not be sent immediately but may instead be sent at pre-determined times (e.g., five minutes prior to an expected decrease of service performance). The service status messaging unit 321 may additionally or alternatively be configured to receive messages transmitted from an on-ground server and/or a service access device.

The vehicle 310 comprises certain hardware devices used to provide the onboard communication service. At least some of the hardware devices used for communication service provision on the vehicle may be self-reporting, for example by providing periodic status updates to the communication service management unit 312. If a status update is not received from a hardware device after a given period of time, the status level of the hardware device may be designated as "unknown," or may be defaulted to "impaired." Certain hardware devices may be configured to recognize when it is experiencing an issue, such as not receiving a requisite voltage level. In such cases, the hardware device may generate an "error" status level. Status updates collected by the control circuitry 320 may be transmitted via the communication system 302 when requested by the on-ground server or based on other events.

The vehicle 310 may communicate bi-directionally with devices outside the vehicle 310 through a network 330. Via the network, the vehicle 310 may transmit communication service data 301 from service access devices and/or network communication devices (e.g., WAP 314, modem 308, communication service management unit 312, etc.). Communication service data may include performance metric data relating to a communication service provided onboard the vehicle 310. Communication service data may include types of devices (e.g., smartphone, laptop, etc.) and/or other information related to service access devices onboard the vehicle 310, including installed software, browser, etc. The vehicle 310 may be configured to transmit, via the network 330, messaging interfaces 303 generated, for example, at the service status messaging circuitry 321. The messaging interfaces 303 may include messages (e.g., text messages, media, etc.) and/or instructions for displaying messages in a display.

Graphical Interface Vehicle and Trip Data Navigation

Figure 4A:
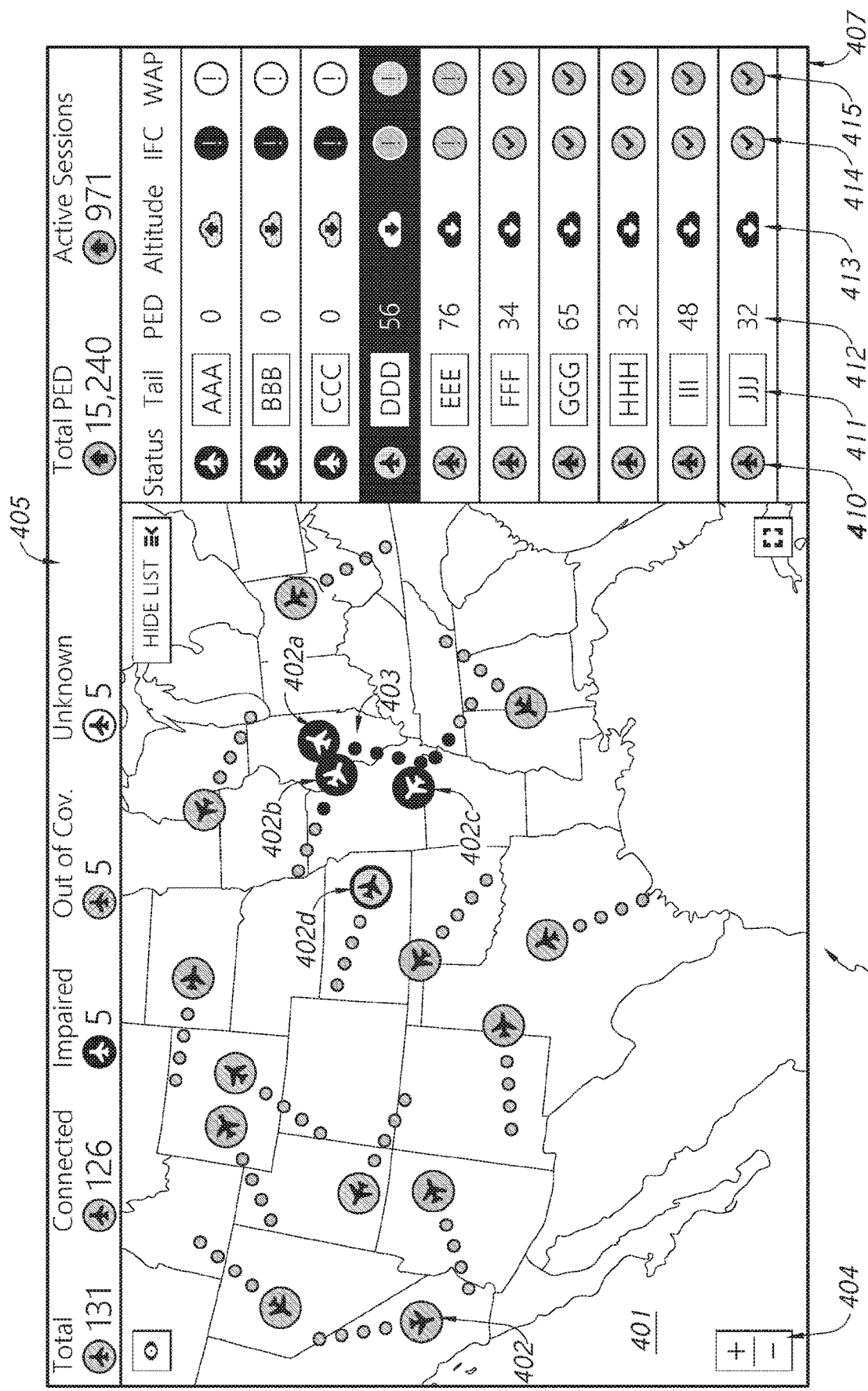
FIG. 4 illustrates a graphical interface representing communication service data associated with a plurality of vehicles in accordance with one or more embodiments.
Figure 4B:
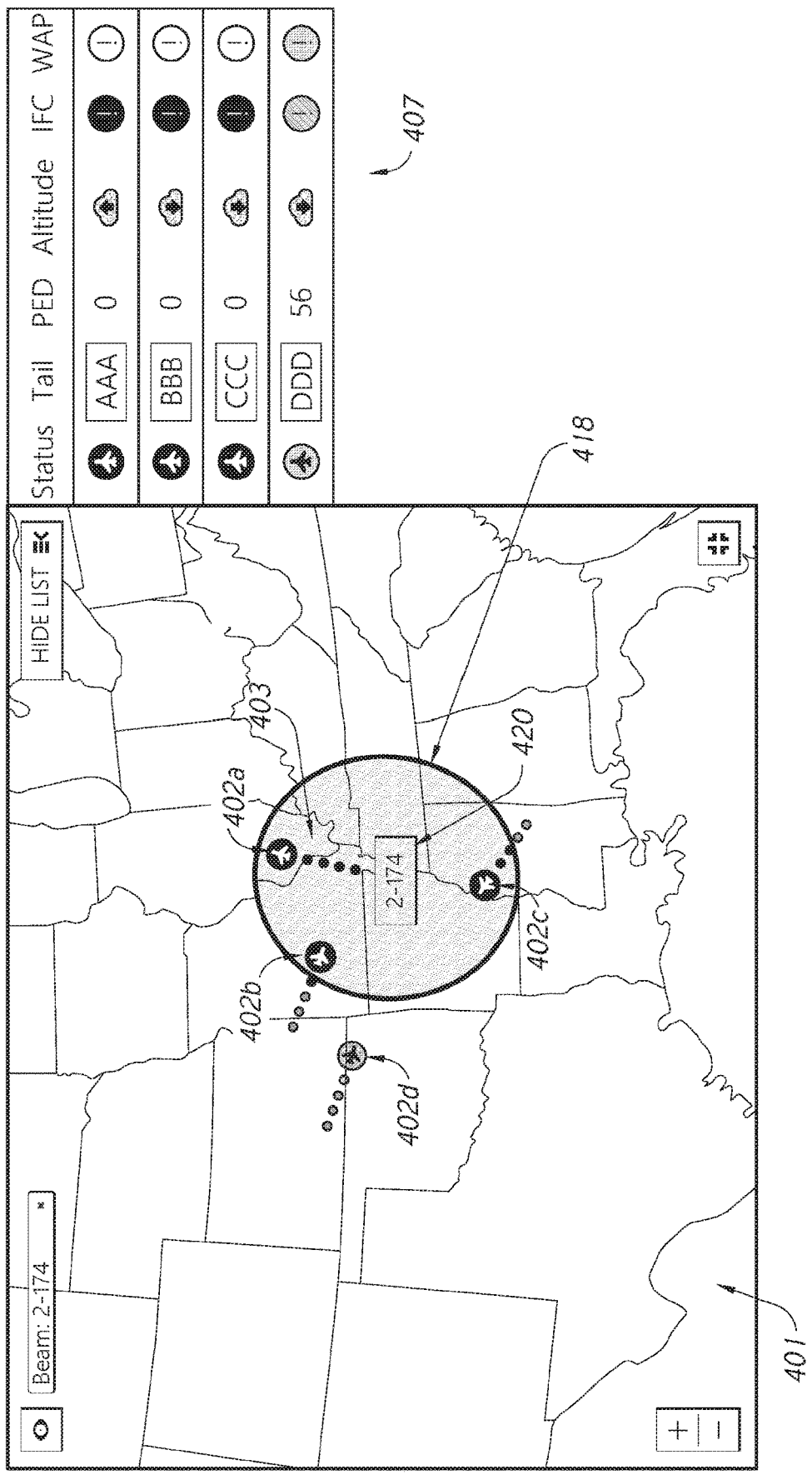

FIG. 4A and FIG. 4B illustrate a graphical interface 400 representing a map interface and communication service data and/or status levels associated with a plurality of vehicles in accordance with one or more embodiments. The interface 400 includes a first graphical interface area representing a map 401 of a geographic area (in the illustrated case, a map of the continental United States) and a plurality of vehicle icons 402 overlaid on the map 401, each of the vehicle icons 402 being a position on the map corresponding to a respective geographic location of an actual vehicle being monitored. Each of the vehicle icons 402 may have an associated set of prior location indicators 403 indicating previous geographic locations of the vehicle. In the illustrated embodiment, the vehicles are aircrafts. Alternatively, other and/or additional types of vehicles (e.g., trains, cruise ships, automobiles) may be represented in the map region 401 or in similar interfaces.

Each of the vehicle icons 402 may correspond to a vehicle in travel. Accordingly, as a location of a vehicle changes over time, the position of the associated vehicle icon 402 may change on the map 401. Each of the vehicle icons 402 may be at a position on the map 401 that corresponds to a current or most recent known location of one of a plurality of vehicles being monitored. Any number of prior location indicators 403 (e.g., four) for each vehicle may be positioned on the map 401, and each prior location indicator 403 may correspond to a previous (i.e., less recent) known location of one of the plurality of vehicles. The location of a vehicle may be determined based on location data received from the vehicle, such as from an onboard server of the vehicle via a network connection, or from a different source (e.g., a vehicle monitoring server). For example, as shown in FIG. 3, a vehicle may include positioning circuitry 319 configured to provide longitudinal and latitudinal coordinates which indicate the vehicle's position on the map 401. Alternatively, location data indicating geographic locations of one or more vehicles within the relevant geographic area may be obtained through another source or means (e.g., from a vehicle monitoring server). The map 401 may include a zoom feature 404 which, when selected, may be configured to allow for zooming in and out with respect to selected portions of the map 401.

In some embodiments, the vehicle icons 402 may include an image or other visual feature that corresponds to the type of vehicle. For example, because the vehicles represented in FIG. 4A and FIG. 4B are aircrafts, each of the vehicles icons 402 in the illustrated embodiments includes an image of an aircraft. A visual feature of a vehicle icon 402 may be indicative of a direction of the vehicle. In some embodiments, the direction of a vehicle may be determined based on location data received from the vehicle. For example, comparison of a present or most recent known location status to a previous location status (e.g., illustrated as prior location indicators 403) of the vehicle may be used to determine the direction of travel of the vehicle. An image corresponding to the type of vehicle may be oriented in the vehicle icons 402 based on the direction of travel.

Each of the vehicle icons 402 may have any of a variety of visual features. In some embodiments, a vehicle icon 402 may be represented in a certain color and/or pattern to indicate a status level of the vehicle, such as a status level of the vehicle with respect to communication service performance provided onboard the vehicle over a period of time or for one or more trips. In some embodiments, if performance of a communication service associated with a vehicle (e.g., WiFi network service provided onboard the vehicle) is impaired in some way (e.g., there are no PEDs currently connected to the network communication service), the vehicle icon may be red, black, and/or may have one or more other visual features indicating an impaired state. In certain embodiments, the color of the vehicle icon may indicate whether the vehicle is out of a coverage area. For example, vehicle icons 402 corresponding to vehicles within a coverage area may be green, while vehicle icons corresponding to vehicles outside the coverage area may be red, according to some embodiments.

In some embodiments, the map 401 may be customized to control which vehicle icons 402 are included in the map 401. For example, in one use case, a user accessing the interface 400 may be an employee of an airline. The user may customize the interface 400, or the interface may be customized automatically in view of login credentials of the user, such that only vehicle icons 402 corresponding to aircrafts associated with the airline are included in the interface 400. The vehicle icons 402 may be filtered in a variety of other ways as well. For example, only vehicle icons 402 corresponding to vehicles with a number of service access devices above a given threshold value may be included. In another example, only vehicle icons 402 corresponding to vehicles with a departure time within a given time range may be included.

The interface 400 may further include a first data table 405 and/or a second data table 407. In some embodiments, the first data table 405 and/or the second data table 407 may be generated and/or presented in response to receipt of an indication of user input associated with an icon (e.g., a vehicle icon 402) of the map 401. For example, an on-ground server may generate graphical interface data representing the first data table 405 and/or the second data table 407 and provide the graphical interface data for display in response to receipt of the user input indication. The user input indication may be associated with a click, hover, tap, or other user input action executed by a user with respect to the map 401. The first data table 405 may provide general data for all vehicles currently represented in the map 401 and/or all vehicles currently in travel (which may be viewable in the map 401 by zooming out and/or scrolling). For example, the first data table 405 may include a total number of vehicles, a total number of vehicles connected to a communication service, a number of vehicles with an impaired connection to the communication service, a number of vehicles outside of any coverage areas, a number of vehicles having a connection status that is unknown, a total number of service access devices (e.g., PEDs) across all vehicles, and a total number of active sessions at service access devices. The first area 405 may further represent additional data and/or status level indications relating to one or more vehicles. For example, the data in the second data table 407 may be related to a vehicle (e.g., a first vehicle) associated with a user input indication (e.g., clicking a first vehicle icon 402*a* associated with the first vehicle).

The second data table 407 which may be generated and/or presented together with the first data table 405 or independently from the first data table 405. That is, in some embodiments, only the first data table 405 may be present, while in other embodiments, only the second data table 407 may be present.

The second data table 407 may include various data corresponding to each of one or more of the vehicle icons 402 on the map 401. For example, each line item or entry of the second data table 407 may include one or more of the following parameters or values: a general status icon 410, a vehicle identifier 411 (e.g., a tail ID for aircraft embodiments), a number of PEDs 412 present on the vehicle and/or having an established connection to a communication service thereon, altitude or other positional information 413 (e.g., indicating an increase or decrease in altitude, speed, or the like), a communication service status icon 414, and hardware device status icon 415. The vehicle identifiers 411 may be any identifying labels assigned to vehicles. For example, in the case of an aircraft, a vehicle identifier 411 may be a federal aviation administration (FAA) number. The PED data 412 may indicate the number of PEDs onboard and/or connected to a network communication service of the vehicle. Each of the status icons 410, 414, 415 may have one or more of a variety of visual features. Visual features may include, for example, a color (e.g., a green color indicating a "normal" status level, yellow color indicating an "impaired" status level, red color indicating an "error" status level, or the like), a shape (e.g., a circle indicating a "normal" status level, a triangle indicating an "impaired" status level, or the like), and/or a symbol (e.g., a checkmark indicated a "normal" status level, exclamation point indicating an "impaired" or "error" status level, or the like). The general vehicle status icon 410 may be an indication of aggregated communication service data (including generated status levels) for the vehicle. For example, if both the communication service icon 414 and hardware device icon 415 indicate a "normal" status level, the general vehicle status icon 410 may also indicate a "normal" status level, whereas if either the communication service icon 414 or the hardware device icons 415 indicate an "impaired" status level, the general vehicle status icon 410 may also indicate an "impaired" status level. The status levels of the communication service icon 414, hardware device icon 415, and/or other icons included in the first data table 405 and/or second data table 407 may be generated using communication service data (including detected performance issues based on communication service data). For example, a detected performance issue may correlate to an "impaired" status level of the communication service icon 414. In some embodiments, the general vehicle status icon 410 may indicate an "impaired" status level only if both the communication service icon 414 and the hardware device icon 414 indicate an "impaired" status level. An "error" status level for the general vehicle status icon 410 may likewise be based on a corresponding "error" and/or "impaired" status level of one or both of the communication service icon 414 and the hardware device icon 415.

Each of the vehicle icons 402 may be selectable via user input. In certain embodiments, a hover event (or a click, tap, or other user input event) at a first vehicle icon (e.g., 402*d*) may cause the data relating to the first vehicle icon (e.g., 402*d*) to be highlighted.

The map 401 may advantageously provide an efficient and simple view of vehicle locations, as well as additional information of the vehicles. By accessing the map 401, users may be able to quickly identify vehicles which may be experiencing issues. Moreover, the map 401 may include various interactive features to allow users to quickly access additional information relating to communication service data of vehicles of interest with respect to one or more trips of the vehicle.

FIG. 4B illustrates a zoomed-in view of the map 401. As shown in FIG. 4B, the second data table 407 may include information for only those vehicles included in the zoomed-in view of the map 401. In some embodiments, the map 401 may comprise one or more coverage areas 418. Each of the one or more coverage areas 418 may correspond to a beam from a satellite (e.g., one of satellites 115*a-b* illustrated in FIG. 1) providing a communication service to vehicles in the coverage area 418.

In some embodiments, coverage areas 418 may be used for detecting expected future issues for a communication service. In some cases, satellite beams may experience service failures causing service outages at the coverage area 418 of the satellite beam. Ongoing and/or historical communication service data collected during one or more trips of a vehicle and/or a fleet of vehicles may be used to determine whether a coverage area 418 is associated with performance issues. For example, communication service data for a concurrent or previous flight of a vehicle may indicate good performance of a communication service onboard the vehicle before the vehicle passed through a coverage area 418, poor performance while the vehicle was in the coverage area 418, and good performance after the vehicle left the coverage area 418. As shown in FIG. 4B, each of the vehicle icons 402*a-c* and points 402 within the coverage area 418 may indicate an "impaired" status level. An "impaired" status level may be indicated by a visual feature (e.g., color) of the vehicle icon or in the second data table 407 (e.g., represented by an exclamation point in the second data table 407). When a performance issue is detected at each vehicle within a given coverage area 418, it can be inferred that there is a service outage at the coverage area 418. Accordingly, vehicles expected to pass through the coverage area 418 may be alerted to the service outage through use of messaging interfaces. Messages may be generated and/or sent preemptively (e.g., without requiring user input) when an issue (e.g., an impaired satellite) is detected.

A vehicle's expected path may be determined based on any of a variety of factors, including the vehicle's location, speed, direction of travel (e.g., determined based on current location compared to previous location), altitude, destination, origin, and/or itinerary. Using the above factors, it may be determined if and/or during what time period the vehicle may be within a given coverage area 418. In some embodiments, a server (e.g., the on-ground server 125 of FIG. 1 and/or the communication server of FIG. 2) may determine an approximate expected entry time and/or exit time of a vehicle with respect to a coverage area 418. The time range between the entry time and exit time may represent an expected future performance issue for the communication service.

In some embodiments, one or more messages may be sent to service access devices onboard a vehicle in response to detecting the expected future performance issue. For example, prior to the entry time, a first message may be sent to devices onboard the vehicle indicating the time range of the expected issue (e.g., beginning time and/or ending time), the length of time of the expected issue, and/or an expected performance level of the communication service during the time range. In this way, passengers and/or crew onboard the vehicle can prepare for a potential decrease of service performance before the decrease of service performance occurs. A first message sent prior to an expected decrease of performance may provide a sufficient amount of time (e.g., five minutes or more) for users to save their work and/or make any other preparations for the decrease of performance. In some embodiments, additional messages may be sent when the time range has ended and/or when the vehicle is out of the coverage area 418.

Some messages indicative of expected decreases in service performance may be transmitted to crew members so that crew members can inform passengers of the issue. A message may provide a variety of options to recipients of the message, including options to modify and/or cancel a selected service (e.g., to receive a refund of a payment for a subscription to the communication service). In some embodiments, payments made by users may be automatically refunded and/or further payments may not be accepted after an expected decrease in service performance is detected. In some embodiments, messages may be transmitted prior to a trip to inform passengers and/or crew members of a vehicle about an expected issue during the trip.

In optional embodiments, messages indicative of expected events not related to a communication service may be generated and/or transmitted to users. In one example, messages may be sent to inform users of expected connection/transfer concerns and/or gate changes at a destination airport or other terminal. In another example, a message may inform users of expected turbulence during a trip.

In some embodiments, a coverage area 418 may have poor performance due to location of the coverage area 418. For example, a coverage area 418 including an airport may experience a high level of congestion of service access devices and the communication service may experience issues due to the congestion.

Vehicle Data Graphical Interface

Figure 5:
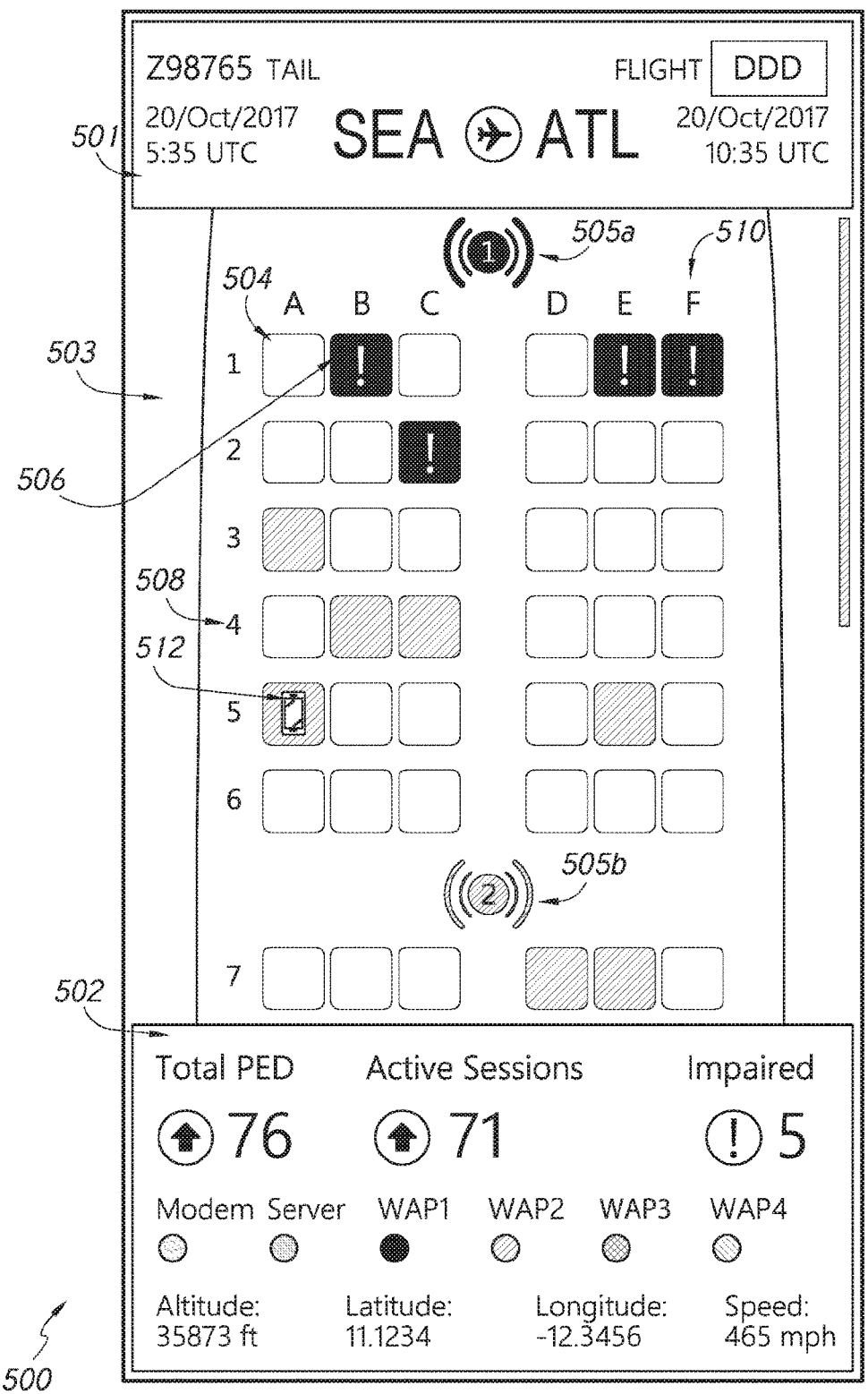
FIG. 5 illustrates a graphical interface representing a vehicle view of status levels of individual service access devices onboard a vehicle in accordance with one or more embodiments.

FIG. 5 illustrates a graphical interface 500 representing a vehicle view of status levels of individual service access devices onboard a vehicle. The graphical interface 500 includes a trip information interface portion 501, a vehicle information interface portion 502, and a vehicle interior interface portion 503. The trip information interface portion 501 may provide various details relating to a trip made by a vehicle, for example including a vehicle identifier, trip identifier, date, time, origin, and destination. The vehicle information interface portion 502 may include various details relating to the vehicle, for example including number of service access devices (e.g., PEDs) onboard the vehicle, number of service access devices connected to a communication service provided on the vehicle, number of service access devices having an "impaired" status level, a device identification key, altitude, latitude, longitude, and speed. The vehicle interior interface portion 503 may include one or more seat identifiers 504 to represent a seat of a vehicle, a service access device onboard the vehicle, and/or a passenger or crew member onboard the vehicle. The vehicle interior interface portion 503 may further include a series of numbers 508, which may represent row numbers of the vehicle, and/or a series of letters 510, which may represent seats in each row. The vehicle interior interface portion 503 may further include one or more WAP identifiers 505, which may indicate an approximate position of a WAP onboard the vehicle.

The graphical interface 500 provides service access device and/or WAP 505 location and status information in a simple format to allow users to quickly and effectively diagnose and/or recognize potential issues relating to a communication service provided on the vehicle. For example, by viewing the graphical interface 500, a user can quickly determine: the proximity between one or more service access devices and a WAP, which service access devices are connected to a particular WAP, and/or which service access devices and/or WAP have "impaired" status levels. Each seat identifier 504 in the vehicle interior interface portion 503 may represent a seat of a vehicle, As shown in FIG. 5, an "impaired" status level may be indicated by an exclamation point 506 or other symbol within or near a seat identifier 504. The "impaired" status level may be associated with a particular user (e.g., a passenger or crew member) or a particular service access device associated with a user. In some embodiments, a seat identifier 504 may include a device icon 512 to indicate the type of PED associated with that seat identifier 504 (i.e., the service access device used by the user at that seat identifier 504).

In some embodiments, each seat identifier 504 may indicate a WAP 505 that the seat identifier 504 is associated with. For example, a user associated with the seat identifier 504 (e.g., seated at the location identified by the seat identifier 504) may be using a service access device that is connected to the WAP 505. Positions of one or more WAPs 505 may be indicated by icons in the graphical interface 500. A device identifier key 510 may be included in the graphical interface 500 to allow users to quickly determine which WAP 505 a given service access device is connected to.

Performance issues may be detected in a variety of ways. In one use case, one or more service access devices having an "impaired" status level may be connected to a first WAP 505a. If the number impaired service access devices connected to the first WAP 505a exceeds a threshold number and/or a percentage of service access devices connected to the first WAP 505a that are impaired exceeds a threshold percentage, it may be determined that there is an issue associated with the first WAP. Accordingly, messages may be sent to crew members and/or passengers onboard the vehicle with instructions that users connected to the first WAP 505a should connect to a different WAP. In another use case, if service access devices across multiple WAPs are impaired, it may be determined that there is an issue associated generally with the communication service of the vehicle. Accordingly, messages may be sent to crew members to restart or otherwise adjust the communication service.

In cases in which an issue is determined to be related to a first WAP 505a, messaging related to the issue may be sent via a second WAP 505b. For example, if it is determined that passengers connected to a first WAP 505a are experiencing decreased service performance, a message may be sent, via a second WAP 505b, to crew members. The message may instruct the crew members to inform the passengers of the issue and suggest that the passengers connect a WAP other than the first WAP 505a.

In some embodiments, the seat identifiers 504 and/or WAP identifiers 505 may be selectable by user input. In one use case, selecting a seat identifier 504 may open a messaging interface for communicating with a user associated with the seat identifier 504 (see, e.g., FIG. 7). The messaging interface may be shown in a new screen or may be shown as a pop-up interface with the graphical interface 500.

Trip Data Graphical Interface

FIG. 6 illustrates a graphical interface 600 representing a table view of communication service data and/or status levels of individual service access devices onboard a vehicle. The graphical interface may include a variety of information related to users and/or service access devices onboard a vehicle. As shown in FIG. 6, the graphical interface 600 may include a user's name, a trip identifier, a seat identifier, a user's class, a service access device status level, a service plan, a user identifier number, a service access device manufacturer, a service access device type, a service access devices operating system (OS), and a service access devices browser. In some embodiments, the information represented in the graphical interface 600 may be filtered. For example, the information may be filtered based on trip identifier 602 and/or status level.

In some embodiments, portions of the graphical interface 600 may be selectable via user input. For example, selecting a user and/or device identifier may prompt generation of a messaging interface (see, e.g., FIG. 7). In some embodiments, the graphical interface 600 may include a messaging icon 604 which may be selected to message all passengers and/or crew members identified in the graphical interface 600.

Selecting a trip identifier (e.g., trip identifier 406 in FIG. 4) may cause generation of trip data graphical interface data representing a set of trip-specific communication service data for a selected trip. That is, for example, in response to receiving an indication of user input associated with a trip identifier, in some embodiments, an on-ground server or other system or entity may generate graphical interface data representing a set of trip data.

Messaging Interface

Figure 7:
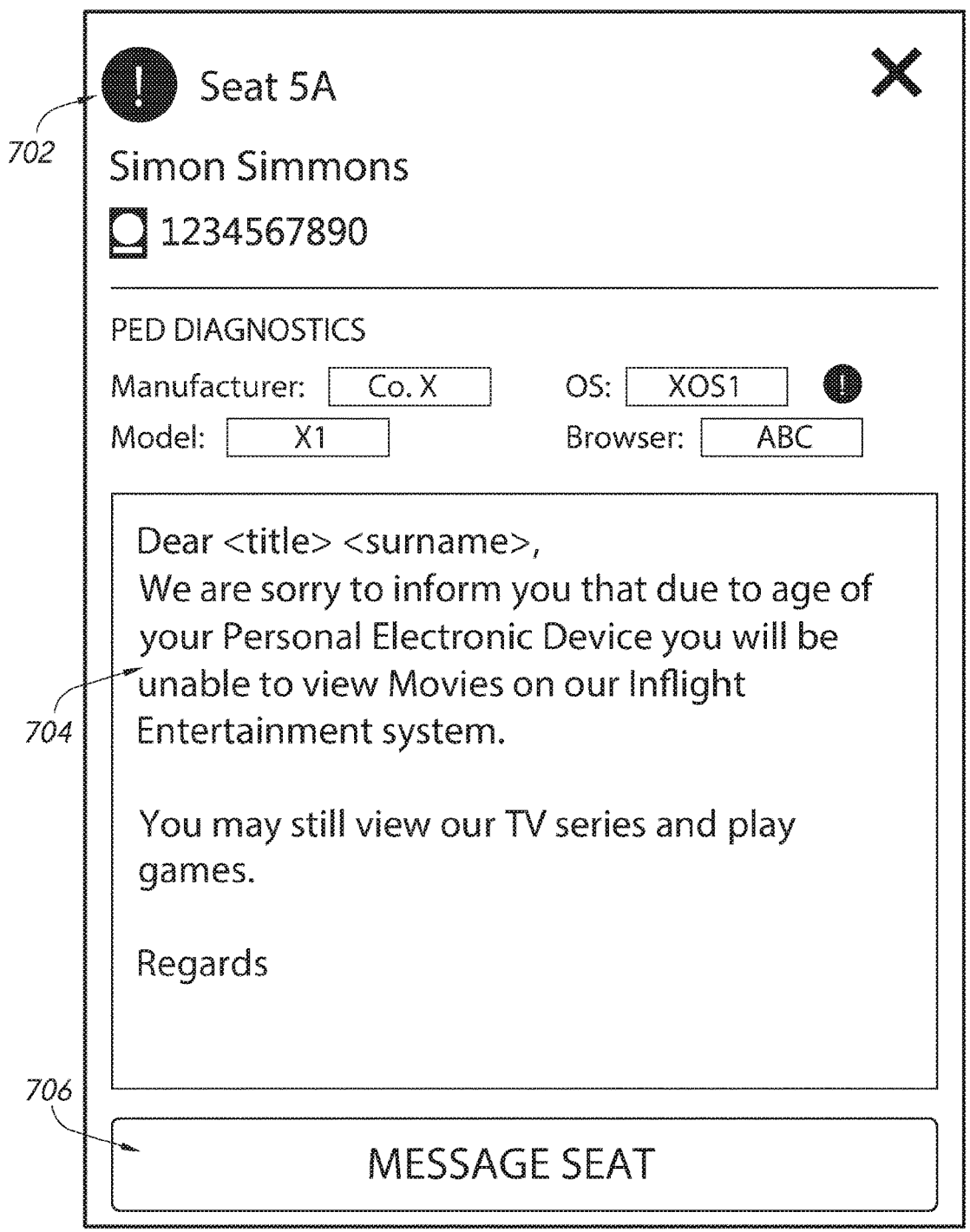
FIG. 7 illustrates a messaging interface for communicating to passengers and/or crew members onboard a vehicle in accordance with one or more embodiments.

FIG. 7 illustrates a messaging interface 700 for communicating to passengers and/or crew members onboard a vehicle. In some embodiments, the messaging interface 700 may include identifying information of a passenger and/or crew member, including a seat identifier, name, and/or identification number. The messaging interface 700 may further include a status level indicator 702 for the user and/or a service access device associated with the user. The messaging interface 700 may further include diagnostic information for a service access device associated with the user, including manufacturer, OS, model, and/or browser.

In some embodiments, the messaging interface 700 may be configured to collect message information from users and facilitate transmission of the message information to the identified passenger and/or crew member onboard the vehicle. The messaging interface 700 may include a message field 704 for inputting text, media, and/or other inputs. For example, the message field 704 may comprise a textual description of an issue relating to a communication service onboard a vehicle. The messaging interface 700 may further include a messaging button 706. When the messaging button 706 is selected, a server may be instructed to transmit the message data in the message field 704 to a passenger and/or crew member (and/or an associated PED) identified in the messaging interface 700.

While FIG. 7 illustrates a messaging interface 700 in which users may compose and provide commands to transmit a message, in some embodiments, composition and/or transmission of messages may be performed automatically. For example, in response to detecting an issue, a server may access messaging data specific to the detected issue and may transmit the messaging data automatically to passengers and/or crew members onboard a vehicle.

In some embodiments, the messaging interface 700 may be displayed in a web page, widget, web application, mobile application, and/or other format. The messaging interface 700 may be configured for display in any type of PED and/or seatback system.

Communication Service Monitoring Processes

Figure 8:
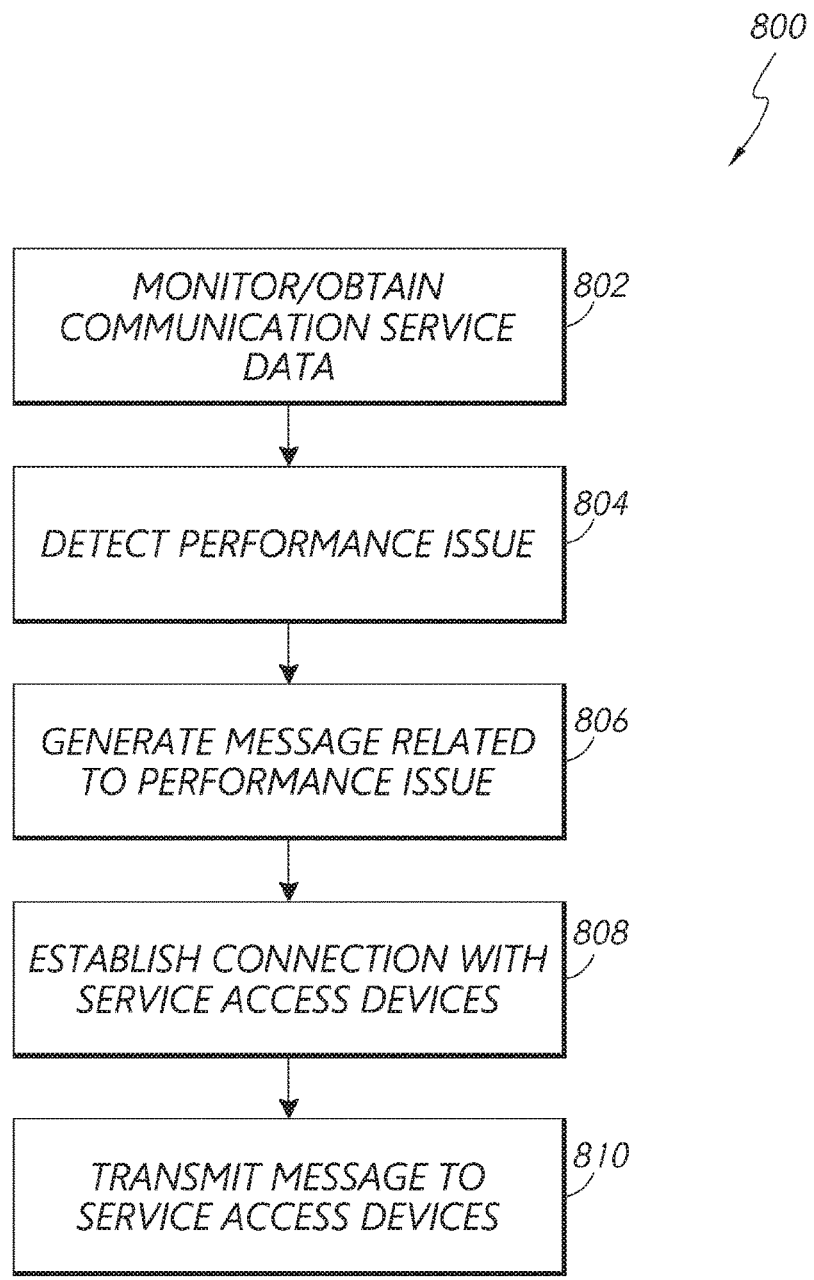
FIG. 8 illustrates a process for messaging passengers and/or crew members onboard a vehicle regarding performance issues of a communication service provided on the vehicle in accordance with one or more embodiments.

FIG. 8 illustrates a process 800 for messaging to passengers and/or crew members onboard a vehicle regarding issues of a communication service provided on the vehicle. Steps of the process 800 may be performed by control circuitry of an apparatus for monitoring a network communication service onboard a vehicle. For example, the process 800 may be performed at least in part by a communication server, such as the on-ground server 125 of FIG. 1 or the communication server 225 of FIG. 2, described in detail above. In certain embodiments, the apparatus performing some or all of the process 800 may be part of an on-ground server that is configured to monitor network communication services of multiples vehicles or a server onboard a vehicle that is configured to monitor network communication services of the vehicle. With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

At block 802, the process 800 involves monitoring and/or obtaining communication service data. Communication service data may be obtained at a server onboard a vehicle and/or at an on-ground server. The communication service data may include values of any of a variety of performance metrics which may be compared to stored threshold values to detect performance issues and/or determine status levels of the communication service at individual devices and/or across an entire vehicle.

In some embodiments, communication service data may include location data of a vehicle. Location data for the vehicle may be obtained at an on-ground server from a vehicle (e.g., from a server onboard the vehicle) or from a source external to the first vehicle, for example a monitoring station or server associated with the vehicle. In some embodiments, location data may indicate coordinates (e.g., latitude and/or longitude) of present or recent locations of the plurality of vehicles. Location data may also include altitude data and/or general location data (e.g., nearest major city). In some embodiments, location data may be used to estimate a future location of the vehicle.

At block 804, the process 800 involves detecting a performance issue relating to the communication service based on the monitored and/or obtained communication service data. A performance issue may be detected automatically based on the monitored communication service data. In one use case, the communication service data may indicate values for performance metrics that may be compared to threshold values. Failures of performance metric values included in communication service data to meet threshold values may result in detection of performance issues at PEDs and/or network communication devices (e.g., WAPs, modems, satellites, on-ground servers, onboard servers). In another use case, location data of the vehicle may indicate a proximity to a service area associated with service outages. In such cases, detecting the performance issue may involve determining a time range when the vehicle may be expected to be within the service area.

In some embodiments, status levels may be generated based on the monitored and/or obtained communication service data. Status levels may include an indication of an "impaired," "normal," and/or "unknown" status level relating to the communication service data. The status levels may be associated with a particular network communication device, a particular PED, and/or a communication service generally.

At block 806, the process involves generating a message related to the detected performance issue. The message may include any of a description of the detected performance issue, instructions for responding to the detected performance issue, and/or options for responding to the message.

At block 808, the process 800 involves establishing a connection with one or more service access devices. The connection with the one or more service access devices may be established via one or more network communication devices (e.g., WAPs, modems, satellites, on-ground servers, onboard servers, etc.) which may be onboard the vehicle or elsewhere. The established connection may be configured for transmission of message data.

At block 810, the process 800 involves transmitting the message to the one or more service access devices. In some embodiments, the message may be transmitted via any of a software application, a text message, and/or an e-mail.

Each of the steps of the process 800 may be iteratively performed for each vehicle of two or more of the plurality of vehicles. New communication service data may be received on a periodic or other basis and corresponding interface data may be updated to include newly received data.

General Comments

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

Reference throughout this disclosure to "some embodiments," "certain embodiments" or "an embodiment" means that a particular feature, structure or characteristic described in connection with the embodiment can be included in at least some embodiments. Thus, appearances of the phrases "in some embodiments," "in certain embodiment," or "in an embodiment" in various places throughout this specification are not necessarily all referring to the same embodiment, and may refer to one or more of the same or different embodiments. Furthermore, embodiments disclosed herein may or may not be embodiments of the invention. For example, embodiments disclosed herein may, in part or in whole, include non-inventive features and/or components. In addition, the particular features, structures or characteristics can be combined in any suitable manner, as would be apparent to one of ordinary skill in the art from this disclosure, in one or more embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A communication service monitoring system comprising:
    at least one network communication device onboard a first vehicle; and
    control circuitry onboard the first vehicle configured to:
        receive communication service data from one or more network communication devices, wherein the communication service data is related to a communication service provided onboard the first vehicle, the communication service data including data collected during one or more trips of a fleet of one or more vehicles not including the first vehicle;
        determine, based at least in part on the communication service data, a coverage area associated with performance issues;
        monitor performance of the communication service provided onboard the first vehicle;
        in response to receiving the communication service data, automatically detect, based at least in part on the communication service data, an expected future performance issue related to the communication service, wherein detecting the expected future performance issue comprises determining, based at least in part on a location of the first vehicle, a time range when the first vehicle is expected to be positioned in the coverage area;
        generate a message comprising a description of the expected future performance issue;
        establish a network connection with each of one or more service access devices onboard the first vehicle, wherein establishing the network connection is performed via the at least one network communication device; and
        transmit the message, via the network connection, to a first service access device of the one or more service access devices.

2. The communication service monitoring system of claim 1, wherein the at least one network communication device is a modem, a wireless access point, a satellite, an on-ground server, or a server onboard the first vehicle.

3. The communication service monitoring system of claim 1, wherein the expected future performance issue involves an expected failure of the first service access device of the one or more service access devices to present media content provided by the at least one network communication device.

4. The communication service monitoring system of claim 1, wherein the expected future performance issue involves an expected failure of a second service access device of the one or more service access devices to present media content provided by the one or more network communication devices.

5. The communication service monitoring system of claim 1, wherein the expected future performance issue involves an expected communication failure between the one or more service access devices and the at least one network communication device.

6. The communication service monitoring system of claim 1, wherein the expected future performance issue involves an expected data rate value of the communication service falling below a threshold data rate value.

7. The communication service monitoring system of claim 1, wherein the expected future performance issue represents an expected future decrease of performance of the communication service.

8. The communication service monitoring system of claim 7, wherein the control circuitry is further configured to obtain, via the network connection, location data indicating the location of the first vehicle.

9. The communication service monitoring system of claim 1, wherein:
    the message comprises an indication of the time range.

10. The communication service monitoring system of claim 1, wherein the message is transmitted via one or more of a mobile application, a web application, a text message, and an e-mail.

11. The communication service monitoring system of claim 1, wherein at least part of the control circuitry is located remotely from the first vehicle.

12. The communication service monitoring system of claim 1, wherein at least part of the control circuitry is located onboard the first vehicle.

13. The communication service monitoring system of claim 1, wherein the control circuitry is further configured to:
    establish a first network connection with a first service access device of the one or more service access devices; and
    establish a second network connection with a second service access device of the one or more service access devices,
    wherein:
        the second network connection has a higher priority level than the first network connection; and
        the message is transmitted via the second network connection.

14. The communication service monitoring system of claim 1, wherein the control circuitry is further configured to receive a response to the message.

15. The communication service monitoring system of claim 1, wherein the control circuitry is further configured to automatically generate, based at least in part on the communication service data, status levels for the communication service data.

* * * * *